(12) United States Patent
Juntunen

(10) Patent No.: US 9,498,399 B1
(45) Date of Patent: Nov. 22, 2016

(54) THERAPEUTIC KNEE APPARATUS

(71) Applicant: Ann A. Juntunen, Belgrade, MT (US)

(72) Inventor: Ann A. Juntunen, Belgrade, MT (US)

(*) Notice: Subject to any disclaimer, the term of this patent is extended or adjusted under 35 U.S.C. 154(b) by 323 days.

(21) Appl. No.: 14/120,018

(22) Filed: Apr. 15, 2014

Related U.S. Application Data

(60) Provisional application No. 61/853,959, filed on Apr. 15, 2013.

(51) Int. Cl.
*A61H 1/02* (2006.01)

(52) U.S. Cl.
CPC ....... *A61H 1/024* (2013.01); *A61H 2201/1253* (2013.01); *A61H 2201/1269* (2013.01); *A61H 2205/102* (2013.01); *A63B 21/4011* (2015.10)

(58) Field of Classification Search
CPC .......... A61H 1/00; A61H 1/02; A61H 1/0237; A61H 1/024; A61H 2201/00; A61H 2201/0107; A61H 2201/0153; A61H 2201/0157; A61H 2201/1253; A61H 2201/1269; A61H 2201/1279; A61H 2201/16; A61H 2201/1657; A61H 2201/1671; A61H 2201/1676; A63B 21/00181; A63B 21/4047; A63B 21/4011; A63B 21/4019; A63B 21/1609; A63B 21/4025; A63B 23/0494; A63B 23/03583; A63B 22/001; A63B 22/0056; A63B 2208/0233

See application file for complete search history.

(56) References Cited

U.S. PATENT DOCUMENTS

| | | | |
|---|---|---|---|
| 4,784,121 A | 11/1988 | Brooks | |
| 4,844,454 A | 7/1989 | Rogers | |
| 5,074,549 A * | 12/1991 | Harvey | A63B 23/0494 482/105 |
| 5,236,333 A * | 8/1993 | Barba, Jr. | A61H 1/024 482/125 |
| 5,662,562 A | 9/1997 | Wohlenberg | |
| 8,409,121 B1 | 4/2013 | Al-Oboudi | |
| 2007/0161479 A1* | 7/2007 | Harris | A61H 1/024 482/148 |
| 2009/0017995 A1 | 1/2009 | Freiberg | |
| 2011/0137215 A1 | 6/2011 | LeBlanc | |
| 2011/0224585 A1 | 9/2011 | Hall | |
| 2014/0106941 A1* | 4/2014 | Evans | A61H 1/0237 482/91 |

* cited by examiner

*Primary Examiner* — Quang D Thanh
(74) *Attorney, Agent, or Firm* — Richard C. Conover

(57) ABSTRACT

A therapeutic knee apparatus for exercising a knee or rehabilitating an injured knee including a squared U-shaped member having an adjustable length central member to which is attached a leg member at each end thereof. A fulcrum is fixedly attached to the central member. An adjustable length lever arm is secured to the fulcrum at selected angular positions with respect to the central member and a handle is attached to the lever arm at a distal end thereof.

4 Claims, 7 Drawing Sheets

THERAPEUTIC KNEE APPARATUS

This application claims the benefit of provisional application Ser. No. 61/853,959 filed Apr. 15, 2013.

BACKGROUND OF INVENTION

The present invention relates to a therapeutic knee apparatus which may be used for exercising a knee or therapeutically used for rehabilitating an injured knee. In particular this apparatus may be used to straighten a leg about the knee joint when the leg is bent at the knee which may occur after knee surgery. Further this apparatus may be used to exercise the knee joint by manually flexing the knee.

Leg exercise devices are known for exercising the knee joint such as U.S. Pat. No. 5,662,562 to Wohlenberg and U.S. Pat. No. 6,821,262 to Muse et al. These devices are cumbersome to use and lack the effectiveness and portability of the present invention.

SUMMARY OF INVENTION

The present invention includes a squared U-shaped member having an adjustable length central member to which is attached a leg member at each end thereof. A fulcrum is fixedly attached to the central member. An adjustable length lever arm is secured to the fulcrum at selected angular positions with respect to the central member and a handle is attached to the lever arm at a distal end thereof. By positioning one leg member on the posterior side of a patient's leg adjacent the ankle and the other leg member on the anterior side just above the knee, the lever arm can be pivoted to provide torque on the knee joint. When the positions of the leg members are reversed, pivoting of the lever arm can be used to exercise the knee joint allowing for knee flexion.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
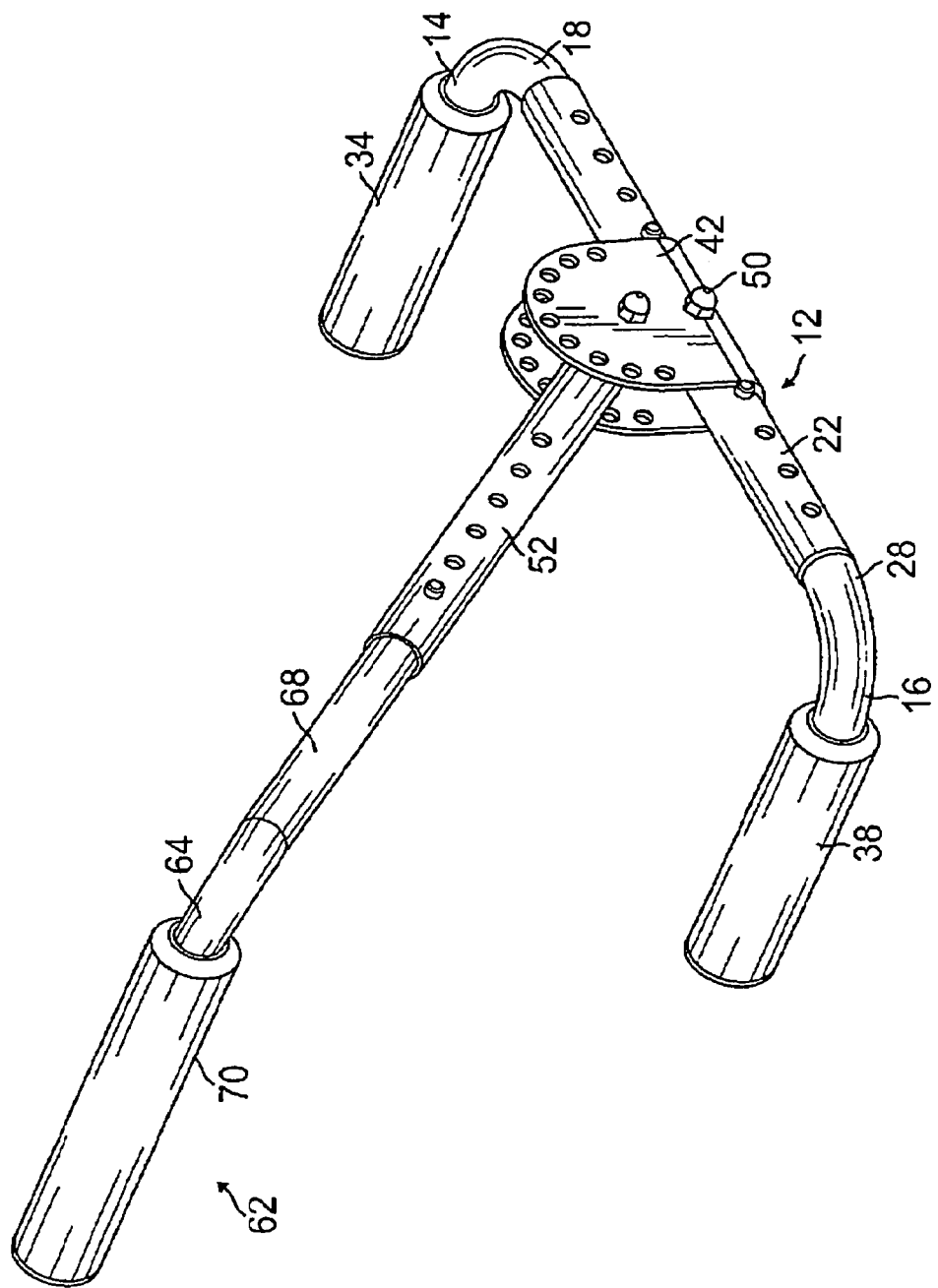
FIG. 1 is a perspective view of therapeutic knee apparatus according to the present invention.
Figure 2:
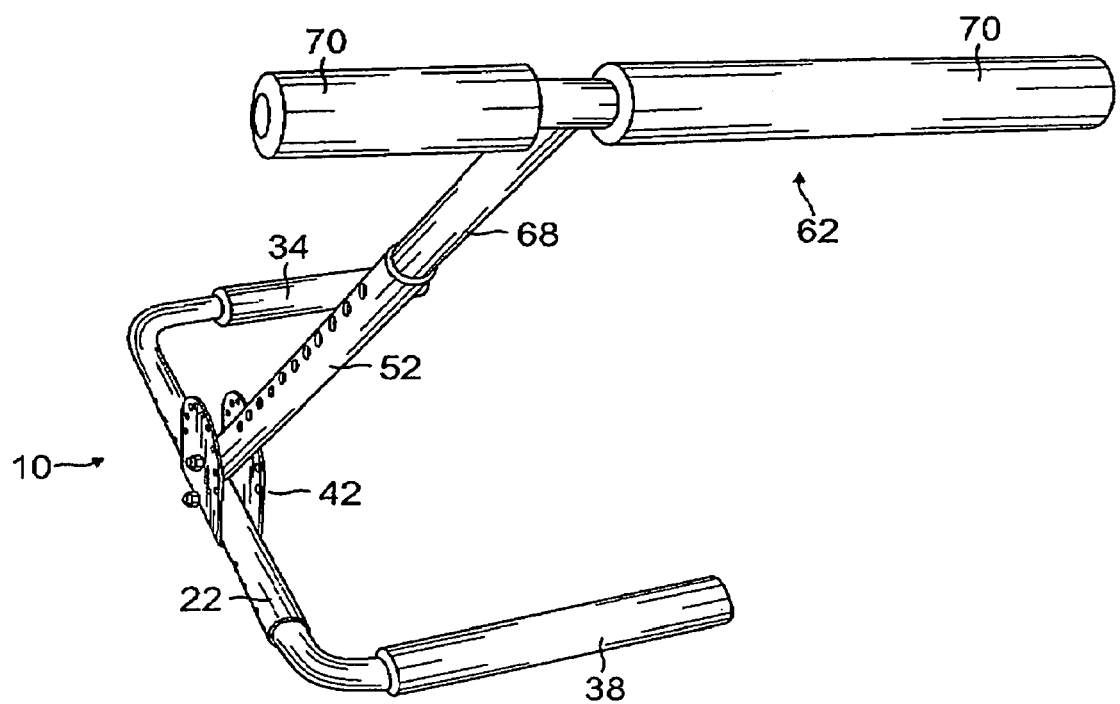
FIG. 2 is a perspective view of a second embodiment of a therapeutic knee apparatus according to the present invention.
Figure 3:
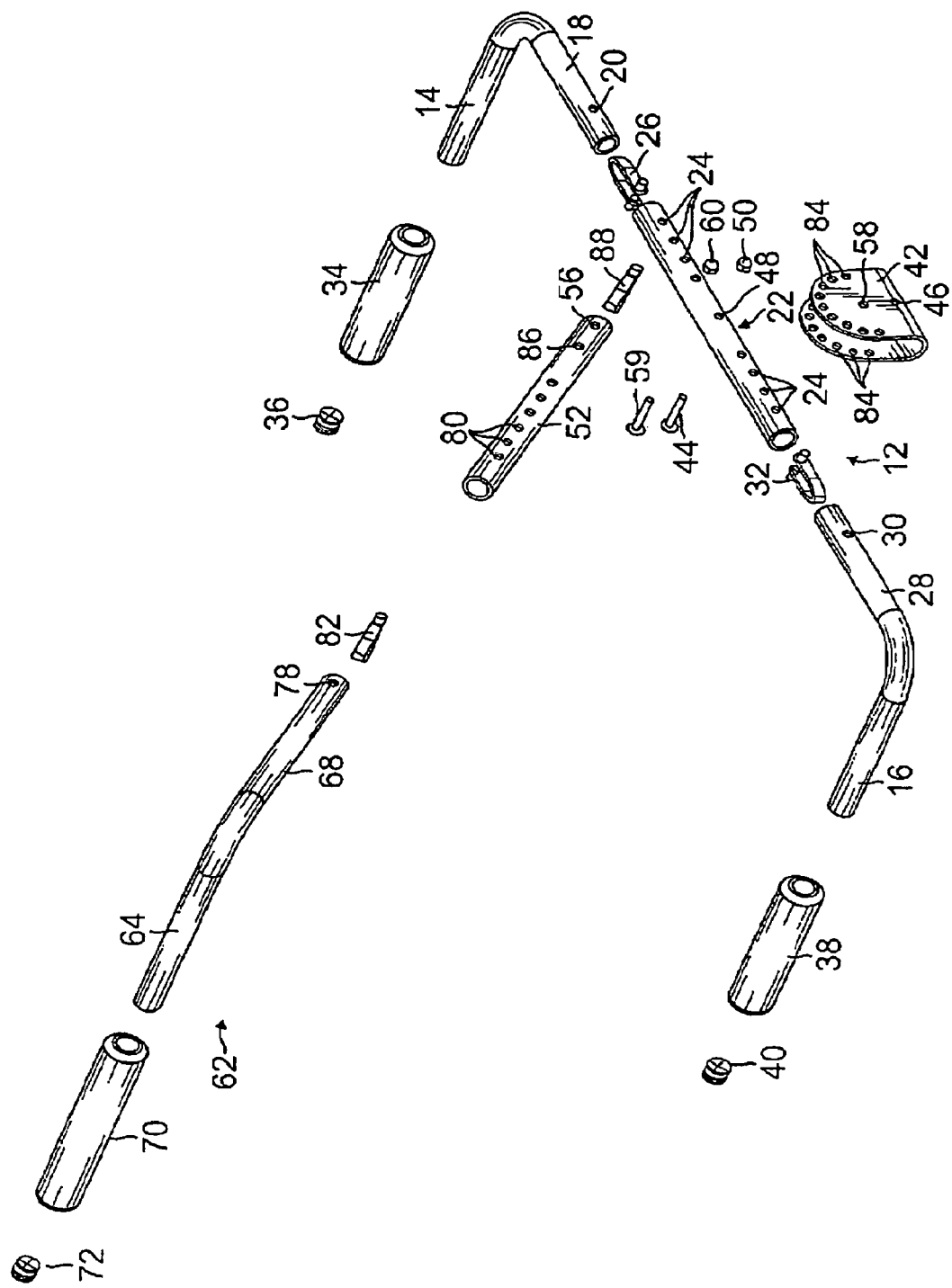
FIG. 3 is an exploded view of the apparatus shown in FIG. 1.

A therapeutic knee exerciser and rehabilitation apparatus 10 is shown in FIGS. 1-3. The apparatus 10 includes an adjustable length tubular rail 12 which is constructed of a first tubular member 18 having a transverse hole 20 provided therein. The first tubular member 18 is slidably received by tubular central member 22 having a series of spaced apart transverse holes 24 provided therein. A spring detent clip 26 is provided for extending through the hole 20 and also through a selected hole 24 to secure the leg 14 in a selected extended position. The tubular rail 12 further includes a second tubular member 28 having a transverse hole 30 provided therein. The second tubular member 28 is slidably received by the tubular central member 22 and a spring detent clip 32 is provided for extending through the hole 30 and a selected hole 24 for adjusting the length of the second leg 16. With this arrangement first tubular member 18 and second tubular member 28 telescope within the tubular central member 22. It is contemplated that other structure could be used to connect the first tubular member 18 and second tubular member 28 at selected positions within the tubular central member 22.

The first member 18 has an orthogonally extending first leg 14 at one end thereof and the second member 28 has an orthogonally extending second leg 16 running parallel with the first leg 14.

A pad 34 and a pad 38 are provided with first leg 14 and second leg 16 respectively which prevent slippage and also provide comfort when the apparatus 10 is used. In a preferred embodiment the pads 34 and 38 include a foam rubber tube slidably fitted on first leg 14 and second leg 16 respectively. An end cap 36 is provided to close the open end of the foam rubber tube for pad 34 and an end cap 40 is used to close the open end of foam rubber tube for pad 38. It is contemplated that other structure for pads 34 and 38 could be used equally as well including pivotally mounted padded plates.

A "U" shaped adjustable fulcrum 42 is attached to the central member 22 with a bolt 44 extending through a hole 46 provided in the fulcrum 42 and a hole 48 provided in the central member 22. A nut 50 secures the bolt 44 in place.

A tubular lever arm 52 is mounted to the fulcrum 42 with a bolt 54 extending through a hole 56 provided in the lever arm 52 and corresponding holes 58 provided in the fulcrum 42. A nut 60 secures the bolt 54 in place.

An "L" shaped handle 62 is provided, as shown in FIGS. 1 and 3, having an arm 64 secured to a stem 68. A foam rubber tube 70 slidably receives the arm 64 which again aids in preventing slippage and provides comfort. A cap 72 closes the open end of the foam rubber tube 70. As an alternative, a "T" shaped handle 62 is shown in FIG. 2. The "T" shaped handle has a pair of arms 64 axially aligned and secured to stem 68. Foam rubber tubes 70 slidably receive the arms 64 and caps 72 close the open ends of foam rubber tubes 70.

As shown in FIG. 3, the tubular stem 68 is provided with a transverse hole 78 and the lever arm 52 is provided with a series of spaced apart holes 80. The tubular stem 68 is sized to be slidably received by the tubular lever arm 52 and a spring detent 82 which extends through the hole 78 and a selected hole 80 provided in the tubular lever arm 52 allows for length adjustment of the handle 62 with respect to the lever arm 52. The tubular stem 68 telescopes within tubular lever arm 52 and other structure could be used to connect tubular 68 at selected positions within tubular lever arm 52.

The adjustable fulcrum 42 has aligned holes 84 extending there through which are spaced apart and equidistant from the hole 58. The lever arm 52 includes a transverse hole 86 and a spring detent 88 extends through the hole 86 and a selected hole 84 which enables a user to select the angular position of the lever arm 52 with respect to the tubular rail 12. It is contemplated that other fulcrums could be used including any structure for allowing a user to selected the angular position of the lever arm 52 with respect to the tubular rail 12.

Figure 4:
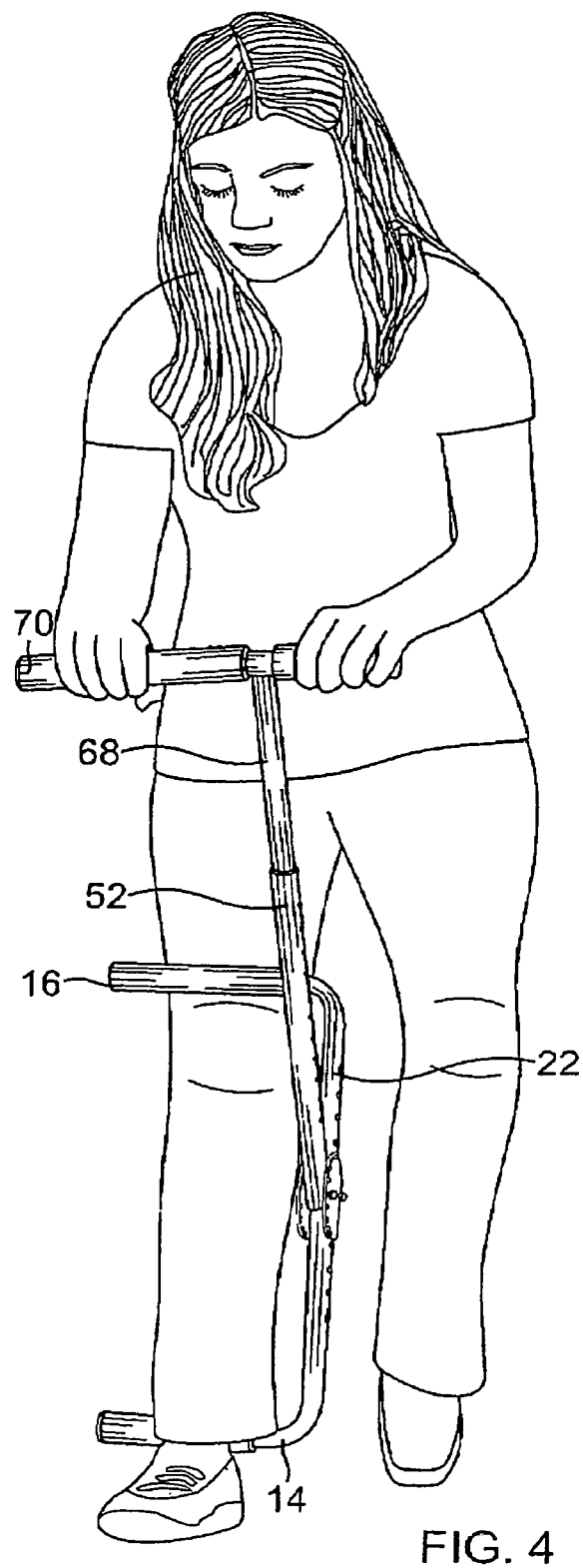
FIG. 4 is a perspective view of a user using the apparatus shown in FIG. 2 to extend a knee.
Figure 5:
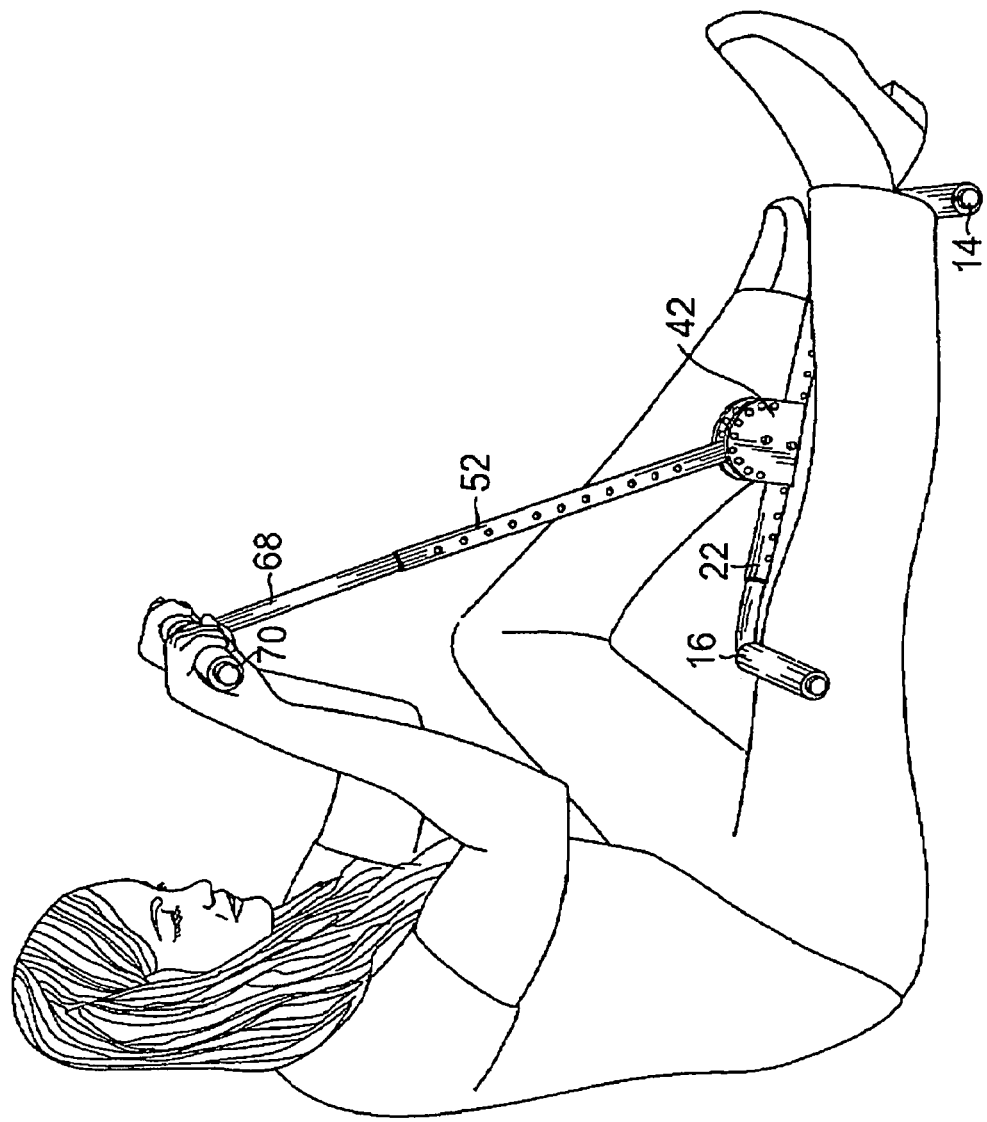
FIG. 5 is a perspective view of a seated user using the apparatus shown in FIG. 2 to extend a knee.
Figure 7:
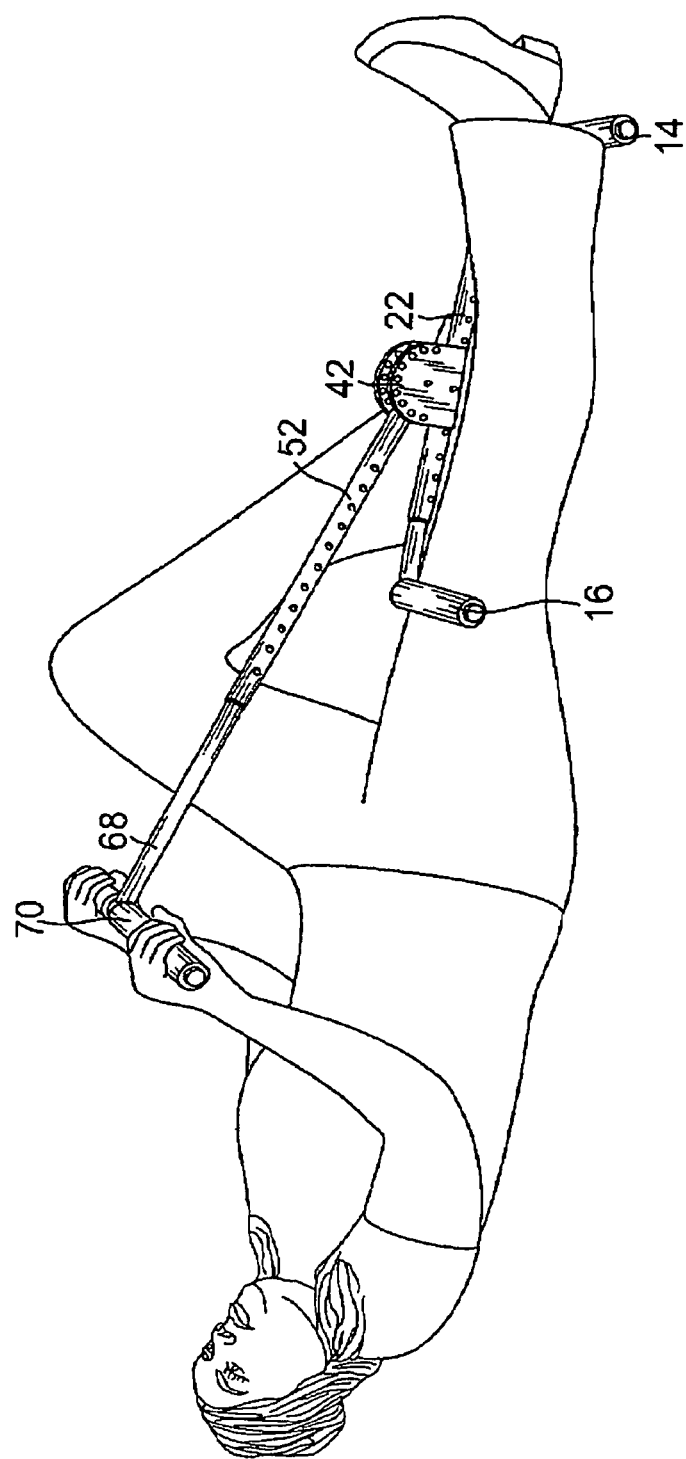
FIG. 7 is a perspective view of a user lying down using the apparatus as shown in FIG. 2.

In operation, the distance between the first leg 14 and second leg 16 is adjusted by manipulating the spring clip 26 and 32 to accommodate the patient using this apparatus. The length of the tubular stem 68 is adjusted with the spring detent 82 to accommodate the user. Further the angular position of the lever arm 52 with respect to the tubular rail 12 is selected with the spring detent 88 to position the lever arm 52 for easy use by the user. The user may now use the apparatus 10 for exercising a knee or therapeutically using the apparatus 10 for rehabilitating an injured knee by stretching it or providing pressure relief. FIG. 4 shows the apparatus 10 being used when a user is in an upright sitting position. Here the first leg 14 is positioned posterior to the ankle of the user and the second leg 16 is positioned anterior to the thigh just superior to the patella or knee cap. When the user pulls back on the "T" handle 62, the apparatus 10 provides torque on the knee moving the knee to an extended position. FIG. 5 shows the use of the apparatus 10 with a user in a long sitting position. The apparatus 10 can also be used in a lying down position as shown in FIG. 7 to accomplish knee extension by adjusting the angular position of the lever arm 52 with respect to the mounting plate 42.

Figure 6:
FIG. 6 is a perspective view of the apparatus shown in FIG. 2 used to flex a knee of a user.

The apparatus 10 may also be used to flex the knee. In this case the first leg 14 is positioned anterior to the ankle of the user and the second leg 16 is positioned posterior to the patella or knee cap as shown in FIG. 6. When a user pushes the "T" handle 62 forwardly, the apparatus 10 acts to flex the knee.

The structure of apparatus 10 also allows for compact storage and portability by depressing the spring detent 88 so that lever arm 52 can be rotated to rest against the tubular rail 12.

While the fundamental novel features of the invention have been shown and described, it should be understood that various substitutions, modifications, and variations may be made by those skilled in the arts, without departing from the spirit or scope of the invention. Accordingly, all such modifications or variations are included in the scope of the invention as defined by the following claims:

I claim:

1. A therapeutic knee apparatus for exercising a knee joint of a patient comprising:
    a squared U-shaped member having a central member having a first and a second end, a first leg orthogonally secured to the first end and a second leg orthogonally secured to the second end and running parallel to the first leg;
    a fulcrum fixedly attached to the central member;
    a lever arm secured to the fulcrum at one of selected angular positions with respect to the central member in a plane orthogonal to the plane of the squared U-shaped member;
    the lever arm having a first end and a second end with the first end connected to the fulcrum; and
    a handle secured to the second end of the lever arm.

2. A therapeutic knee apparatus for exercising a knee joint of a patient comprising:
    a squared U-shaped member having an adjustable length central member having a first end and a second end, a first leg orthogonally secured to the first end and a second leg orthogonally secured to the second end and running parallel to the first leg;
    a fulcrum fixedly attached to the central member;
    an adjustable length lever arm secured to the fulcrum at one of selected angular positions with respect to the central member in a plane orthogonal to the plane of the squared U-shaped member;
    the lever arm having a first end and a second end with the first end connected to the fulcrum; and
    a handle secured to the second end of the lever arm.

3. The therapeutic knee apparatus according to claim 2 further including a pad mounted to each of the first and second legs.

4. The therapeutic knee apparatus according to claim 2 wherein the adjustable length central member includes telescoping tubes which are connected together at selected longitudinal positions and wherein the adjustable lever arm includes telescoping tubes which are connected together at selected longitudinal positions.

* * * * *